March 15, 1960 C. H. NILES 2,928,237
RAMJET DIFFUSER
Original Filed April 13, 1953
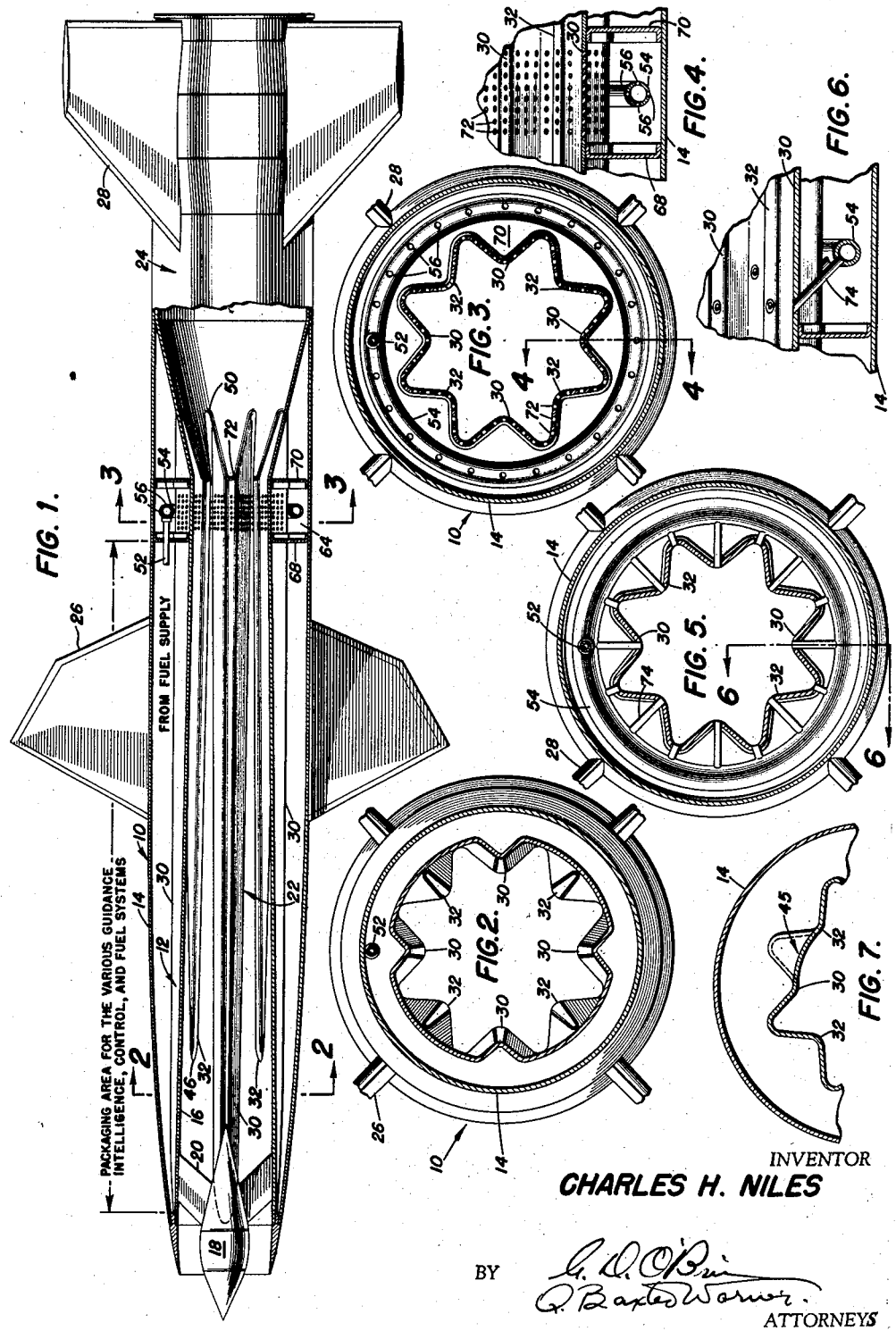
INVENTOR
CHARLES H. NILES United States Patent Office 2,928,237
Patented Mar. 15, 1960

2,928,237

RAMJET DIFFUSER

Charles H. Niles, Baltimore, Md., assignor to the United States of America as represented by the Secretary of the Navy Continuation of application Serial No. 348,169, April 13, 1953. This application March 14, 1957, Serial No. 645,963

2 Claims. (Cl. 60—35.6)

This invention relates to aerial vehicles of the ramjet type, and, in particular, to a ramjet diffuser configuration. This application is a continuation of U.S. patent application Serial No. 348,169, filed by applicant on April 13, 1953, for "Ramjet Diffuser," now abandoned.

It is one of the objects of this invention to provide a ramjet diffuser configuration which is designed to prevent rotational currents of air and which provides a housing for other essential parts and accessories of the vehicle or missile.

It is another object of this invention to provide a unique ramjet diffuser configuration which will improve the structural design of the ramjet, that is, increase the moment of inertia of the sections of the ramjet diffuser that are subjected to large bending moments.

Still another object of this invention is to provide a ramjet diffuser configuration in which contours or corrugations act as straighteners in order to reduce the radial flow of air passing through the diffuser.

And even another object of the invention is to provide a ramjet diffuser configuration which will have contours or corrugations therein which can be utilized to contain combustor fuel injectors, feed lines, ignition devices, and other accessories of the vehicle.

And even still a further object of the invention is to provide a ramjet diffuser configuration having contours or corrugations formed therein which can be utilized for component installations of the vehicle which would otherwise require a greater outside diameter thereof, or external contours which would increase parasitic drag of the vehicle.

The present invention makes it possible to eliminate any nozzle injection apparatus in the interior of the duct of the vehicle by providing suitable means in the walls of the diffuser for injecting the fuel from around the surface of the diffuser into the airstream.

Another object of the invention is to provide a ramjet diffuser configuration having contours or corrugations formed therein in which efficient use is made of space and which results in a smaller outside diameter of the missile, with less drag and improved performance thereof.

These and other objects of the invention will be apparent from the following description taken in conjunction with the accompanying drawings forming a part of this invention, and in which:

Fig. 1 is a longitudinal sectional view of a ramjet vehicle, such as a missile, having portions thereof shown in elevation and embodying the features of this invention;

Fig. 2 is a cross section on line 2—2 of Fig. 1;

Fig. 3 is a cross section on line 3—3 of Fig. 1;

Fig. 4 is a cross section on line 4—4 of Fig. 3;

Fig. 5 is a modification of the injection arrangement illustrated in Fig. 3;

Fig. 6 is a cross section on line 6—6 of Fig. 5; and

Fig. 7 is a cross section similar to Fig. 3, illustrating another modification of the invention.

In accordance with the invention, an aerial vehicle, such as a missile of the ramjet type, is provided with an inner wall having longitudinal contours or corrugations to prevent eddy currents and the like to provide a housing for missile accessories. The contours or corrugations extend, in general, throughout the diffuser section, and thus present a unique design of a diffuser which is highly efficient and has high performance characteristics.

Referring now to Fig. 1 of the drawings, there is illustrated an aerial vehicle 10, such as a missile of the ramjet type, which has an outer body 12 formed with an outer wall 14 and an inner wall 16. The aerial vehicle 10 may be provided with an inner body 18, which is supported by strut members 20 to the inner wall 16 of the outer body 12, and which is located at the forward portion of a unique diffuser configuration 22. The diffuser 22 comprises the invention and it will be discussed in greater detail subsequently.

This aerial vehicle 10 is also provided with a combustor chamber 24 at its rearward end and in which combustion of the fuel mixture takes place, as well as an exit nozzle (not shown) through which the hot gases liberated by the burning of the fuel mixture escape and develop sufficient thrust to push the aerial missile along its trajectory. A plurality of wings 26 and fins 28 are provided on the aerial missile 10 for steering and roll stabilizing the same.

The unique diffuser configuration 22 includes a plurality of longitudinal contours or corrugations, such as 30, and 32, in the inner wall 16 of the outer body 12. The number and length of the corrugations or contours provided in the inner wall 16 will depend upon the ramjet vehicle's internal aerodynamic requirements. However, in the embodiment of the invention as illustrated in Figs. 1 through 3, it is to be observed that eight (8) longitudinal contours are provided, four each of 30 and 32. The contours or corrugations 30 extend from the forwardmost portion of the diffuser 22 throughout the length thereof, while the longitudinal contours or corrugations 32 start rearward of corrugations 30, as indicated by 46, and extend throughout the length of the diffuser 22 to the forward portion 50 of the combustor 24. This is better illustrated in Figs. 2 and 3.

It is to be noted, however, that the contours or corrugations can be provided throughout the length of the aerial missile 10, including the combustor 24 or intermediate thereof. As further indicated in Figs. 2 and 3, the contours are grooves of crest-trough shape, in cross-section, and vary in depth along the principal axis thereof depending upon the desired internal aerodynamics and/or structural requirements specified for the aerial vehicle 10. From the configuration of Fig. 1, when considered in connection with Figs. 2 and 3, it is seen that the grooves increase in depth rearwardly along the principal axis to the forward portion 50 of the combustor 24. These contours or corrugations 30 and 32 can be of any length. It is their main function, as previously pointed out, to prevent rotational currents of air by acting as straighteners for the air flow through the diffuser 22. This configuration improves the internal aerodynamics of the diffuser, with the result that the combustion efficiency is also increased.

Another advantage of using the contours or corrugations 30 and 32 resides in providing greater rigidity for the diffuser configuration 22. The areas defined by a pair of crests and a trough therebetween can be utilized for storing vehicle accessories and parts which are necessary for the operation of the missile. The fuel supply tank or tanks as well as the fuel lines 52 can be provided in these areas, such as illustrated in Fig. 1, to restrict the mass movement of fuel in violent motions of the aerial vehicle. In addition to providing longitudinal contours in the surface of diffuser 10, certain of these contours can be removed for a short distance to provide additional space for the storing or packaging of larger vehicle accessories as indicated by 45 in Fig. 7. If necessary, other contours can be interspersed between the longitudinal contours 30 and 32 and be inclined at an angle thereto to provide a vehicle with increased rigidity and strength, and, at the same time, these contours can be used in conjunction with the longitudinal contours for storing vehicle accessories.

The diffuser configuration previously described gives greater rigidity to the over-all vehicle structure 10 due to the fact that the moment of inertia of a particular cross-section is increased, due to increased depth, while the bending moment at the cross-section remains substantially constant, thus the overall effect is to reduce the stress levels at this cross-section, with an increase in rigidity of the vehicle 10.

Referring again to Fig. 1 of the drawings, the fuel that passes through fuel line 52 is introduced into an annular manifold 54 which has a plurality of apertures, such as 56, provided therein and through which the fuel escapes into a second annular chamber 64, provided around the diffuser 22. A plurality of nozzles, such as 72, are provided in the inner wall 16 of the outer body 12. The fuel from the annular chamber 64, located between side walls 68 and 70 and the inner and outer walls 16 and 14, respectively, of the outer body 12, passes through these nozzles 72 and is injected into the airstream passing through the diffuser 22. The air and the fuel are then mixed together by suitable means and are subsequently ignited and burned in the combustor 24. The gases liberated due to the burning of the air-fuel mixture pass through an exit nozzle (not shown) provided at the rearmost end of the vehicle 10. The escaping of the gases through the exit nozzle causes thrust forces to be developed for propelling the vehicle 10 along a trajectory.

In Figs. 5 and 6 there is shown a modification of the arrangement for injecting fuel into the duct. Instead of using a plurality of nozzles in the inner wall 16 of the diffuser 22, a plurality of passageways 74 are provided between the annular manifold 54 and the inner wall 16. It will be noted that a passageway is provided for each crest and trough in the ramjet diffuser configuration. The manifold 54 is supported by these passageways, which, in turn, are supported by the diffuser 22. It will be further noted that these passageways may be inclined or transverse to the longitudinal axis of the missile 10 in order to provide better mixing of the fuel with the airstream. A nozzle or the like can be provided at the end of each passageway for injecting the fuel into the airstream.

To recapitulate, after the ramjet vehicle 10 has been launched by suitable launching means, and has reached the desired Mach number, it continues to fly along its trajectory due to the power developed by its own power plant. The air that passes between the inner body 18 and the outer body 12 flows through the diffuser 22 where velocity energy is converted into pressure energy. At a suitable area along the vehicle 10, preferably near the end of the diffuser 22 or at the beginning of the combustor 24, fuel is injected into the airstream through the orifices, such as 72, or through the passageways 74. The air and fuel are mixed together and later ignited. The liberated gases are then utilized to propel the missile.

The contours or corrugations 30 and 32 are provided principally to eliminate the rotational air currents in the diffuser 22, and, therefore, make it possible to obtain a higher combustion efficiency and better performance characteristics from the vehicle. These contours or corrugations also make it possible to design an aerial vehicle with high strength and rigidity, and simplicity for mass production.

Obviously many modifications and variations of the present invention are possible in the light of the above teachings. It is therefore to be understood that within the scope of the appended claims the invention may be practiced otherwise than as specifically described.

What is claimed is:

1. In an aerial vehicle of the ramjet type having an outerbody, an innerbody located in the forward portion of said outerbody, a combustor located in the rearward portion of said outerbody, and fuel injection means between said innerbody and said combustor; the combination therewith of an improved diffuser section extending longitudinally from said innerbody to said combustor and comprising an inner wall of said outerbody, and a plurality of longitudinal grooves formed in said inner wall and extending substantially the full length of said diffuser section, said grooves increasing in depth rearwardly along the longitudinal axis of said vehicle to said fuel injection means, said grooves continuing to increase in depth rearwardly from said fuel injection means toward said combustor.

2. In an aerial vehicle of the ramjet type having an outerbody, an innerbody located in the forward portion of said outerbody, a combustor located in the rearward portion of said outerbody, and fuel injection means between said innerbody and combustor; the combination therewith of a unitary means for straightening the ram air flow entering said combustor and for increasing the structural rigidity of said vehicle, comprising, an inner wall of said outerbody and extending longitudinally from said innerbody to said combustor, and a plurality of longitudinal grooves in said inner wall and extending substantially the full length of said inner wall, said grooves increasing in depth rearwardly along the longitudinal axis of said vehicle to said fuel injection means, said grooves continuing to increase in depth rearwardly from said fuel injection means toward said combustor.

References Cited in the file of this patent

UNITED STATES PATENTS

| | | |
|---|---|---|
| 2,632,994 | Sargent | Mar. 31, 1953 |
| 2,644,396 | Billman | July 7, 1953 |
| 2,686,473 | Vogel | Aug. 17, 1954 |
| 2,690,314 | Porter et al. | Sept. 28, 1954 |